(12) United States Patent
Chen et al.

(10) Patent No.: US 9,171,108 B2
(45) Date of Patent: Oct. 27, 2015

(54) SOLAR PANEL DEPLOYMENT CONFIGURATION AND MANAGEMENT

(75) Inventors: Wei-Peng Chen, Fremont, CA (US); Chetan Ramaiah, Buffalo, NY (US)

(73) Assignee: FUJITSU LIMITED, Kawasaki (JP)

( * ) Notice: Subject to any disclaimer, the term of this patent is extended or adjusted under 35 U.S.C. 154(b) by 151 days.

(21) Appl. No.: 13/601,065

(22) Filed: Aug. 31, 2012

(65) Prior Publication Data

US 2014/0067332 A1 Mar. 6, 2014

(51) Int. Cl.
*G06K 9/34* (2006.01)
*G06F 17/50* (2006.01)

(52) U.S. Cl.
CPC ........ *G06F 17/5004* (2013.01); *G06F 2217/78* (2013.01)

(58) Field of Classification Search
None
See application file for complete search history.

(56) References Cited

U.S. PATENT DOCUMENTS

| | | | | |
|---|---|---|---|---|
| 8,107,726 | B2* | 1/2012 | Xu et al. | 382/173 |
| 8,249,346 | B2* | 8/2012 | Dammann | 382/173 |
| 2008/0189031 | A1* | 8/2008 | Meadow et al. | 701/208 |
| 2008/0262789 | A1* | 10/2008 | Pershing et al. | 702/156 |
| 2009/0234692 | A1* | 9/2009 | Powell et al. | 705/7 |
| 2009/0304227 | A1* | 12/2009 | Kennedy et al. | 382/100 |
| 2010/0110074 | A1* | 5/2010 | Pershing | 345/423 |
| 2010/0179787 | A2* | 7/2010 | Pershing et al. | 702/156 |
| 2011/0205245 | A1* | 8/2011 | Kennedy et al. | 345/636 |
| 2012/0035887 | A1* | 2/2012 | Augenbraun et al. | 703/1 |
| 2013/0148882 | A1* | 6/2013 | Lee | 382/164 |
| 2013/0246010 | A1* | 9/2013 | Dershowitz et al. | 703/1 |
| 2014/0015924 | A1* | 1/2014 | Pryor | 348/43 |
| 2014/0025343 | A1* | 1/2014 | Gregg et al. | 703/1 |

OTHER PUBLICATIONS

Zhou, W., and A. Troy. "An object-oriented approach for analysing and characterizing urban landscape at the parcel level." International Journal of Remote Sensing 29.11 (2008): 3119-3135.*
"Module Pricing", Solarbuzz—Solar Market Research and Analysis, NPD Group, Jun. 16, 2012, <http://www.solarbuzz.com/facts-and-figures/retail-price-environment/module-prices>.
"AEO2012 Early Release Overview", EIA Annual Energy Outlook 2012, U.S. Energy Information Administration, Jan. 23, 2012, <http://www.eia.gov/forecasts/aeo/er/executive_summary.cfm>.
Nofuentes et al., "Tools for the profitability analysis of grid-connected photovoltaics," Progress in Photovoltaics: Research and Applications, Sep. 17, 2012, vol. 10 Issue 8, pp. 555-570.
Paatero et al., "Effects of largescale photovoltaic power integration on electricity distribution networks", Renewable Energy, Sep. 3, 2005, vol. 32, No. 2, pp. 216-234.
Achanta et al., "SLIC Superpixels", EPFL Technical Report 149300, Jun. 2010.

(Continued)

*Primary Examiner* — Li Liu
(74) *Attorney, Agent, or Firm* — Maschoff Brennan (57) ABSTRACT

A system for deploying solar panels may include a classification module configured to receive an image of a structure with a roof and to classify portions of the image that include portions of the roof as roof image segments. The system may also include an identification module configured to identify a property of the roof based at least in part on the roof image segments and a configuration module configured to determine a configuration of one or more solar panels for placement on the roof based on the identified property of the roof.

17 Claims, 9 Drawing Sheets

(56) References Cited

OTHER PUBLICATIONS

"The Sun as an Energy Source", Technology Fundamentals, Renewable Energy World, May 2003, pp. 90-93, <www.volker-quaschning.de/articles/fundamentals1/index.php>.

Photovoltaic Education Network PVCDROM, Christiana Honsberg and Stuart Bowden, Aug. 27, 2012, <http://www.pveducation.org/pvcdrom>.

"Managing Large-Scale Penetration of Intermittent Renewables", MIT Energy Initiative Symposium, Apr. 20, 2011, <http://web.mit.edu/mitei/research/reports/intermittent-renewables-full.pdf>.

"Solar Power Panel Orientation: Landscape vs. Portrait", A Cooper B-Line Technical White Paper, Oct. 2010, <http://www.cooperindustries.com/content/dam/public/bline/Markets/Solar/Resources/Panel-Orientation-Landscape-vs-Portrait.pdf>.

Sproul, "Derivation of the solar geometric relationships using vector analysis", Renewable Energy, Oct. 20, 2005, vol. 32, Issue 7, pp. 1187-1205.

"1991-2005 Update: Typical Meteorological Year 3", National Solar Radiation Data Base, Dec. 29, 2009, <http://rredc.nrel.gov/solar/old_data/nsrdb/1991-2005/tmy3/>.

Muneer et al., "Large-scale Solar PV Investment Models, Tools and Analysis: The Ontario Case", IEEE Trans. Power Systems, Apr. 2011, <http://ece.uwaterloo.ca/~ccanizar/papers/wajid.pdf>.

Geronimo et al., "Model features and Horizontal Line Estimation for Pedestrian Detection in Advanced Driver Assistance Systems", Proceedings of the 1st Internal Workshop on Current Challenges in Computer Vision, 2006, <http://www.cvc.uab.es/~dgeronimo/publications/geronimo_cvcrd2006.pdf>.

Bhalerao et al., "Unsupervised Image Segmentation Combining Region and Boundary Estimation", Image and Vision Computing, Aug. 24, 2000, vol. 19, Issue 6, pp. 1-28.

Yang et al., "Methodology for Precisely Estimating the Generation of Standalone Photovoltaic System," 2009 International Conference on Environmental Science and Information Application Technology, Jul. 4-5, 2009, vol. 1, pp. 48-51.

Bacher et al, "Online Short-term Solar Power Forecasting", Proceedings from 1'th International Workshop on Integration of Solar Power into Power Systems, 2011, Six pages.

* cited by examiner

SOLAR PANEL DEPLOYMENT CONFIGURATION AND MANAGEMENT

FIELD

The embodiments discussed herein are related to solar panels and solar power generation.

BACKGROUND

Solar generated electricity is becoming more common with a reduction in price of solar panels and an increase in price for electricity generated from fossil fuels or nuclear power plants. In the near future, solar generated electricity may become cheaper than traditional electricity generated from fossil fuels. Government subsidies and new business models such as solar panel rental may spur the acceptance of solar generated electricity.

As solar generated electricity becomes more common, power system stability may become an issue because of a fluctuating amount of electricity generated using solar panels. Under these circumstances, a better understanding of power generation from deployed solar panels within a power grid may become increasingly important for proper power grid management.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system for deploying solar panels may include a classification module configured to receive an image of a structure with a roof and to classify portions of the image that include portions of the roof as roof image segments. The system may also include an identification module configured to identify a property of the roof based at least in part on the roof image segments and a configuration module configured to determine a configuration of one or more solar panels for placement on the roof based on the identified property of the roof.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to methods and system for determining deployment configurations for solar panels. In particular, some embodiments described herein relate to determining deployment configurations for solar panels deployed on roofs of structures and for managing deployed solar panels on roofs of structures.

In general, a property of a roof of a structure may be identified based at least in part on an image. For example, a map may illustrate a roof of a structure or a satellite image may include a roof of a structure. Using the map and/or the satellite image, a footprint of a roof may be obtained. In some embodiments, using the map and/or the satellite image, an orientation of the roof may be obtained. In some embodiments, additional information, such as a street view image of a structure or building plans for a structure may be used to obtain additional properties of a roof, such as a slope angle of the roof, and/or a height of the roof.

Using properties of a roof, a configuration for solar panels deployed on the roof may be determined. In some embodiments, the configuration of the solar panels may be determined to achieve a desired outcome, such as an average electrical output for a set period, a peak electrical output, a minimum electrical output, or another outcome. Various factors may be considered when configuring the solar panels. For example, the factors may include an orientation of the solar panels, a number of the solar panels, a tilt angle of the solar panels, shading of the roof, weather factors, time dependent electricity rates, and electricity usage of the structure. Some factors, such as the orientation of the solar panels, the number of the solar panels, and/or the tilt angle of the solar panels, may be variable factors that allow for adjustment when configuring the solar panels to achieve a desired outcome.

After configuring the solar panels, the expected electrical output may be generated. The expected electrical output may be used to determine a profitability of deploying the solar panels.

In some embodiments, the above-described process for determining the profitability of deploying solar panels may be automated. The automated process may be used to determine the properties of roofs of multiple structures, such as for a majority of roofs within a neighborhood, city, county, state, or some other region, to determine the profitability of a large-scale solar panel deployment without the cost of manually gathering information to determine the profitability.

After deployment of the solar panels, having the configuration of the solar panels recorded may also allow for more accurate prediction of power generation under various conditions, such as changing weather conditions. More accurately predicting power generation may allow for better management of a power grid that includes the solar panels and thus better management of the solar panels.

Embodiments of the present invention will be explained with reference to the accompanying drawings.

Figure 1:
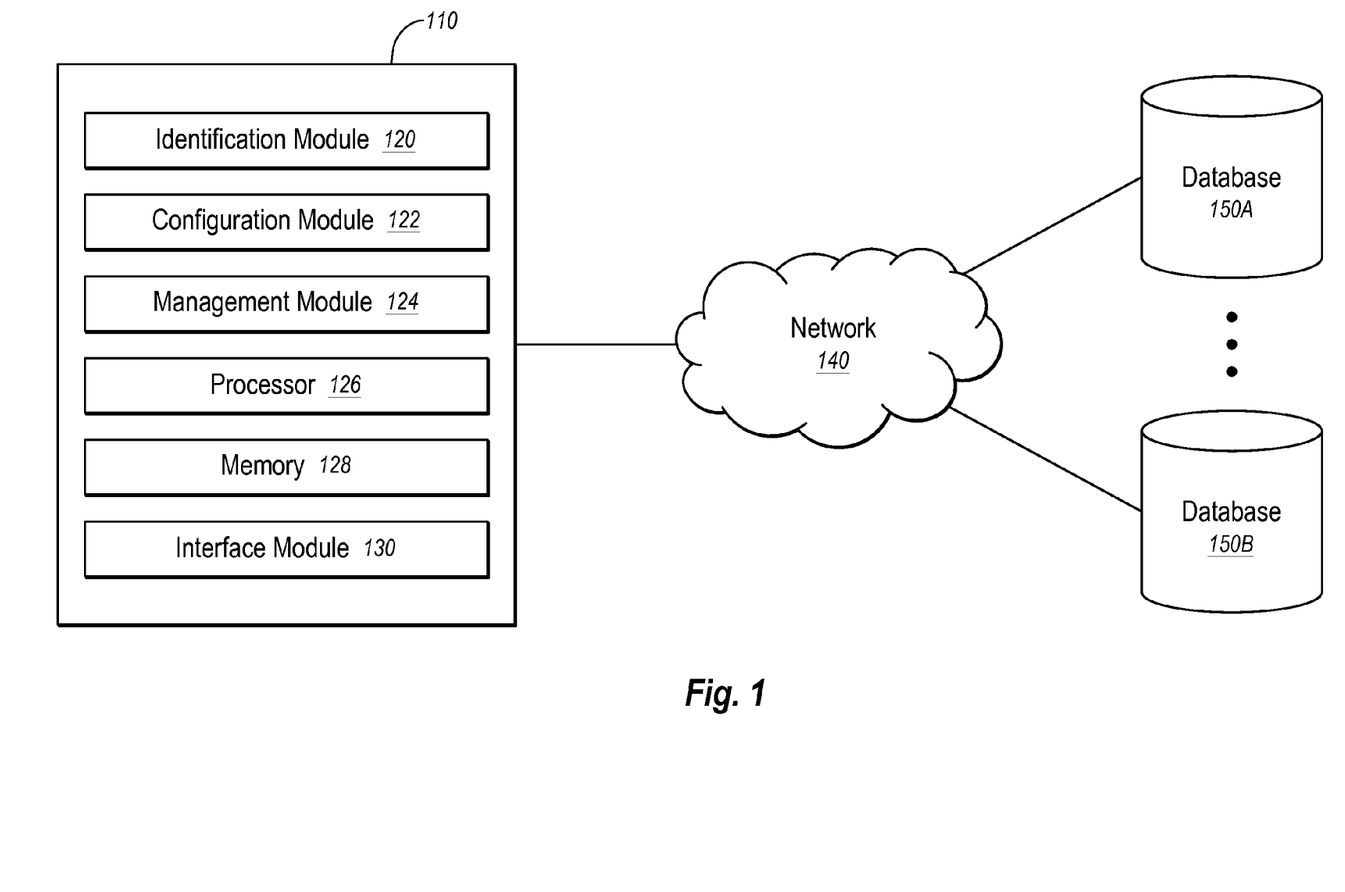
FIG. 1 illustrates an example solar panel deployment configuration and management system.

FIG. 1 illustrates an example solar panel deployment configuration and management system 110 (hereinafter "the system 110"), arranged in accordance with at least some embodiments described herein. The system 110 may include an identification module 120, a configuration module 122, a management module 124, a processor 126, a memory 128, and an interface module 130. The system 110 may be coupled to a network 140 that is coupled to databases 150, including a database 150A and a database 150B.

The network 140 may be configured to connect the system 110 to the databases 150. The network 140 may include any interconnecting system capable of transmitting data, images, video, or any combination of the preceding. The network 140 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. The databases 150 may be any type of databases, servers, or other storage units that may store images, videos, records, and other data about a structure. The databases 150 may be publically or privately operated or operated by the government.

In general, the system 110 may be configured to determine configurations for deploying solar panels on a roof of a structure, such as a home, a commercial building, a warehouse, a condominium, an apartment, and other structures. For each determined configuration, the system 110 may also determine an estimate of an amount of electricity that may be generated from the deployed solar panels, a profitability of deploying the solar panels on the structure, among other things.

The identification module 120, within the system 110, may be configured to identify one or more properties of a roof of a structure on which one or more solar panels may be deployed. The properties identified by the identification module 120 may include a footprint of the roof, a slope angle of the roof, an orientation of the roof, a height of the roof, or geographical location of the structure.

In some embodiments, the identification module 120 may determine properties of a roof using images and/or data collected from one or more of the databases 150 through the network 140. For example, the identification module 120 may receive images, such as satellite images or other aerial images of structures, from the databases 150. The satellite images may be public satellite images, such as satellite images available from Google, Microsoft, and others. Using the images, the identification module 120 may determine a footprint of a roof and/or an orientation of the roof. As another example, the identification module 120 may access street view images or video of a structure. Using the street view images or video, the identification module 120 may determine a slope angle of the roof and/or the height of the roof. Alternately or additionally, the identification module 120 may receive additional aerial images of the roof that are captured at different angles with respect to the roof than other received aerial images. Using the difference in angles of the images with respect to the roof, the identification module 120 may determine a slope angle and/or other roof properties.

In some embodiments, the identification module 120 may access other data from the databases 150. For example, the identification module 120 may access maps that illustrate structures and footprints of roofs of the structures. Using the maps, the identification module 120 may determine a footprint of the roof, the orientation of the roof, and other properties of the roof.

In some embodiments, the identification module 120 may access public records, or other records from the databases 150 that indicate properties of a roof of a structure, such as a footprint of the roof, a height of the roof, a geographical location of the roof, and other information. In some embodiments, the identification module 120 may derive properties of a roof based on records received from the databases 150. For example, a height of a roof of a structure may be derived from the number of stories of the structure. As another example, a slope angle of a roof of a structure may be derived based on a determined slope angle of a roof of another structure adjacent to the structure.

The configuration module 122 may be configured to determine a configuration for a deployment of solar panels on a roof based on the identified properties of the roof. In some embodiments, the configuration module 122 may configure the solar panels to achieve a desired outcome. Some desired outcomes may include, but are not limited to, average electrical output for a set period, such as for an hour, day, week, month, or year, by the solar panels, a peak electrical output by the solar panels, a minimum electrical output by the solar panels, maximizing revenue for selling electricity generated by the solar panels, matching electricity generated by the solar panels to electricity demand for a structure or group of structures, or some other outcome.

To achieve a desired outcome, various factors that affect the electricity generated by the solar panels on the roof may be considered in addition to one or more of the identified properties of the roof. Some factors may include, but are not limited to, weather patterns in the area of the roof, shading of the roof, orientation of the solar panels, a number of the solar panels on the roof, a tilt angle of the solar panels, electricity usage of the structure, electricity buyback programs, time dependent electricity rates, solar panel interconnectivity and mechanisms, among others. All, some, or none of the mentioned factors may be considered when determining a configuration of the solar panels on the roof. Some of the factors considered may be variable factors, such as the orientation, tilt angle, and number of solar panels. A range for each of the variable factors may be considered when determining the configuration of the solar panels and certain values within the considered ranges of the variable factors may be selected based on the desired outcome. For example, in some embodiments, the tilt angle and/or orientation of solar panels on identical or similar roofs may be different based on different desired outcomes for each of the roofs.

The management module 124 may be configured to estimate expected electricity generation for a configuration of solar panels on a roof. The management module 124 may be configured to estimate the expected electricity generation for the solar panels based on historical weather data. Alternately or additionally, the management module 124 may be configured to estimate the expected electricity generation for the solar panels in real time based on current weather data. For example, based on a weather forecast, the management module 124 may be configured to estimate the expected electricity generation for the solar panels based on the configuration of the solar panels. The estimated expected electricity generation may be used to manage a power grid coupled to the solar panels. By estimating the expected electricity generation, a better understanding of fluctuations of electricity generated by the solar panels may be understood and thus better management of the power grid coupled to the solar panels may occur. Note that estimating the expected electricity generation of solar panels using the determined configuration of the solar panels as explained below may produce better estimates as compared to estimating the expected electricity generation of solar panels with less detailed information about the solar panel's configuration. Thus, determining the configuration of the solar panels may increase an ability to deploy the solar panels in a manner to meet a desired outcome as well as to provide for better management of the solar panels after deployment of the solar panels.

The management module 124 may also be configured to estimate a profitability of deploying solar panels on a roof based on an expected amount of electricity to be generated by the solar panels. In some embodiments, the management module 124 may be configured to estimate a profitability of deploying solar panels on roofs of multiple structures within a region. In some embodiments, the management module 124 may determine the profitability of deploying solar panels within multiple regions. The management module 124 may rank the regions using the estimated profitability for each region and may present the rankings to a user of the system 110. By ranking the estimated profitability of each region, the regions with higher estimated profitability may be targeted for deployment before regions with lower estimated profitability, allowing for faster investment returns when deploying solar panels.

In some embodiments, the processor 126 may be configured to execute computer instructions that cause the system 110 to perform the functions and operations described herein. The computer instructions may be loaded into the memory 128 for execution by the processor 126 and/or data generated, received, or operated on during performance of the functions and operations described herein may be at least temporarily stored in the memory 128.

The interface module 130 may be configured to interface with other devices to receive information for the identification module 120, the configuration module 122, and/or the management module 124. For example, the interface module may receive an indication of a region, such as a city or county, for which an automated process may be used to determine the properties of roofs of structures within that region. The interface module 130 may also be configured to interface with other devices to send information generated by the system 110. For example, the interface module 130 may present the profitability of solar panel deployment over a given area, an expected amount of electricity generated for a given configuration of solar panels, or other information. In some embodiments, the interface module 130 may be configured to interface with the network 140 and to receive information from and/or send information to the databases 150.

Modifications, additions, or omissions may be made to the system 110 without departing from the scope of the present disclosure. For example, the system 110 may not include the management module 124. In these and other embodiments, the interface module 130 may present a configuration of solar panels to a user or send the configuration to another system for further processing. In some embodiments, the identification module 120, the configuration module 122, and the management module 124 may be implemented as computer readable instructions stored on a computer readable medium that may be executed by a processor such as the processor 126 as described herein.

Figure 2:
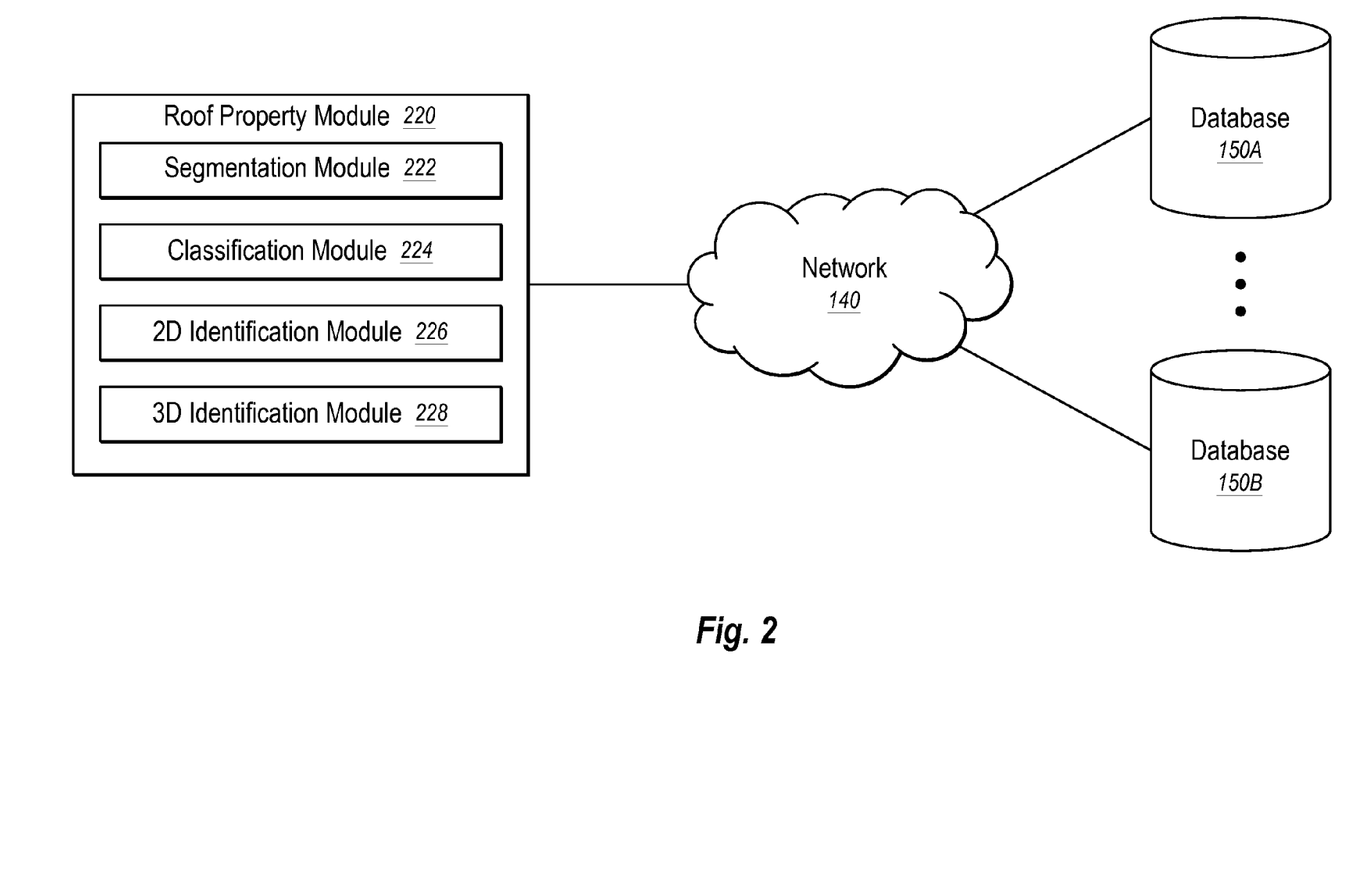
FIG. 2 illustrates an example roof property module.

FIG. 2 illustrates an example roof property module 220, arranged in accordance with at least some embodiments described herein. The roof property module 220 may be configured to determine properties of roofs. In particular, the roof property module 220 may be configured to determine properties of roofs using images, such as satellite or other aerial images. In some embodiments, the roof property module 220 may be part of a solar panel deployment configuration and management system, such as the system 110 of FIG. 1. In particular, the roof property module 220 may be part of or used in place of the identification module 120 of the system 110 of FIG. 1.

The roof property module 220 may be coupled to the network 140 and databases 150. The network 140 and the databases 150 have been described above with respect to FIG. 1, as such no further explanation is provided here. The roof property module 220 may include a segmentation module 222, a classification module 224, a 2D identification module 226, and a 3D identification module 228.

The segmentation module 222 may be configured to receive an image of structures. In particular, the segmentation module 222 may be configured to receive an aerial image that illustrates roofs of the structures within the image. In some embodiments, the segmentation module 222 may receive the image from one or more of the databases 150 by way of the network 140.

Figure 3A:
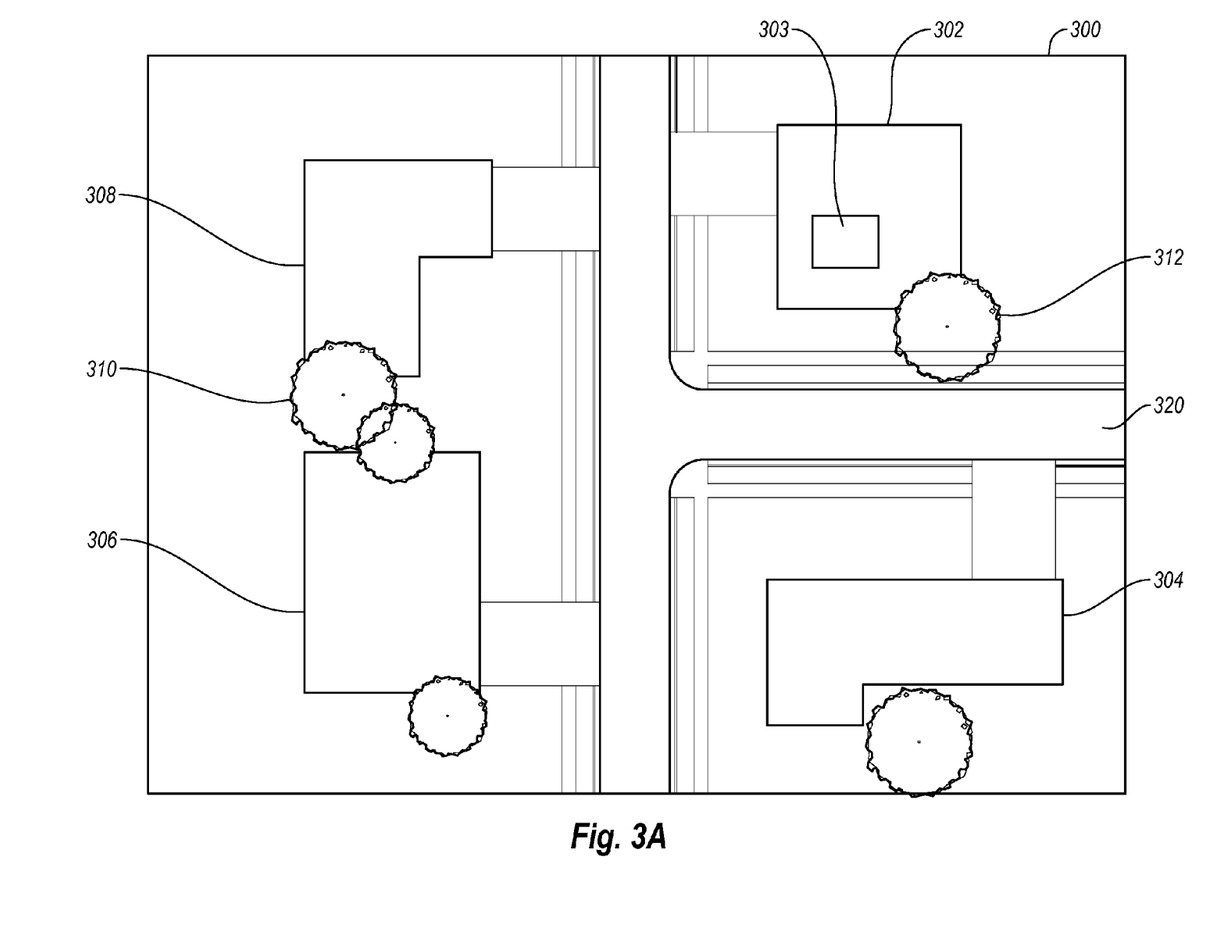
FIG. 3A illustrates an example aerial image that illustrates roofs of structures within the aerial image.

FIG. 3A illustrates an example aerial image 300 that illustrates roofs of structures within the aerial image 300, arranged in accordance with at least some embodiments described herein. The aerial image 300 includes first, second, third, and fourth roofs 302, 304, 306, and 308, trees 310, 312, and a street 320. FIG. 3A further illustrates a skylight 303 or other structure or opening within the first roof 302. FIG. 3A is provided by way of illustration only of a type of aerial image that may be used by the segmentation module 222.

Returning to the discussion of FIG. 2, in some embodiments, the segmentation module 222 may be further configured to receive a map that corresponds to the image. The map may include an indication of lots or parcels of land. A lot of land may include a structure. The segmentation module 222 may identify the lots and the lots' boundaries within the map. The segmentation module 222 may be configured to correlate the map with the image and remove or segment the portions of the image that correspond to the lot boundaries within the map. By segmenting the image according to the lots within the map, the segmentation module 222 may remove portions of the image that do not include structures, such as streets, sidewalks, parks, and other objects within the image. By removing portions of the image that do not include structures, the segmentation module 222 may reduce the computation intensity and/or time to determine properties of roofs within the image.

Figure 3B:
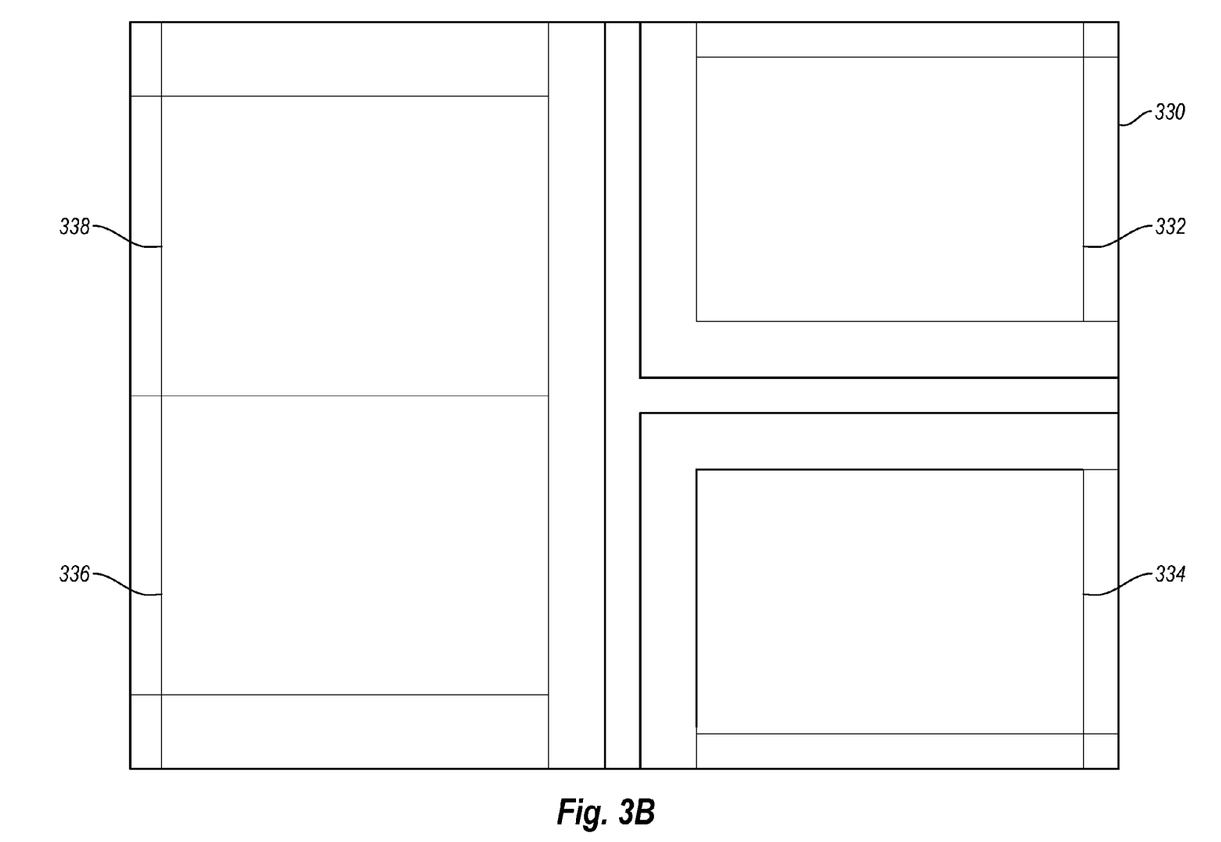
FIG. 3B illustrates a map corresponding to the aerial image of FIG. 3A.
Figure 3C:
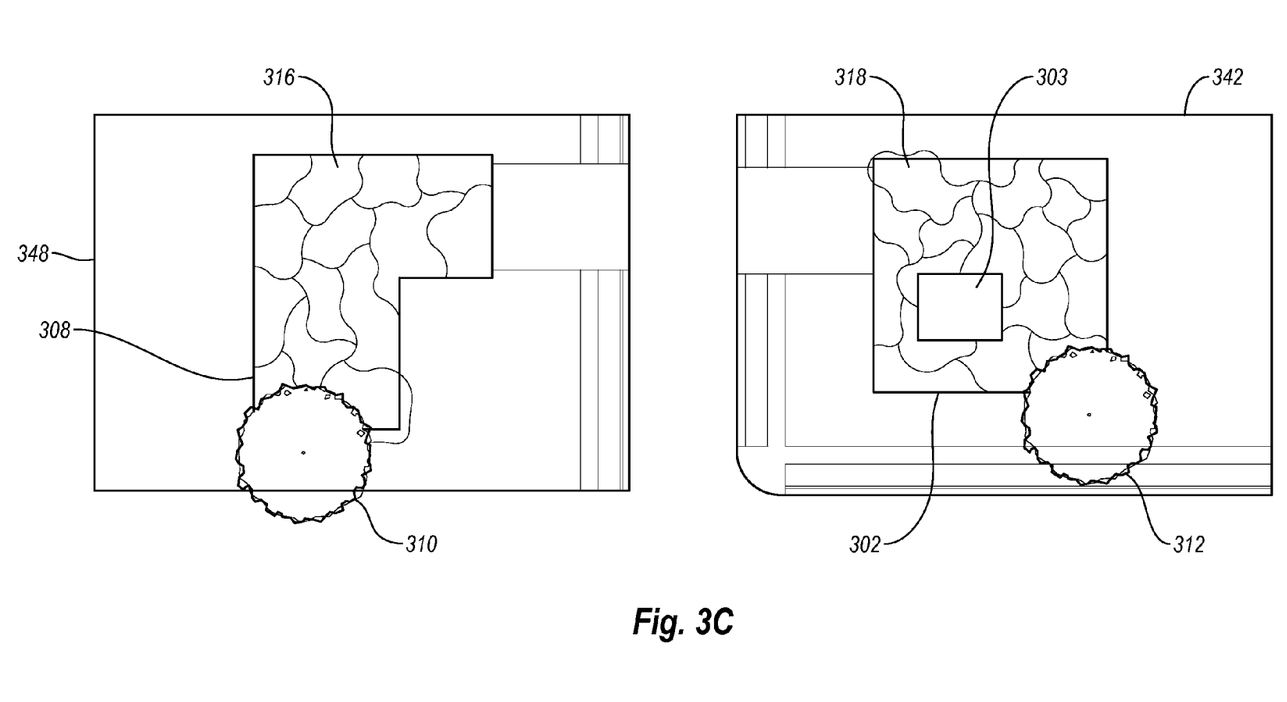
FIG. 3C illustrates segmentation of the aerial image of FIG. 3A.

FIG. 3B illustrates a map 330 corresponding to the aerial image of FIG. 3A, arranged in accordance with at least some embodiments described herein. The map 330 illustrates first, second, third, and fourth lots 332, 334, 336, and 338 that may respectively correspond to the first, second, third, and fourth roofs 302, 304, 306, and 308. FIG. 3C illustrates segmentation of the aerial image 300 of FIG. 3A according to the lots 332, 334, 336, and 338 of FIG. 3B. In particular, FIG. 3C illustrates image segments 342 and 348 of the aerial image 300 of FIG. 3A that correspond to the first and fourth lots 332 and 338, respectively so that the image segment 342 includes the roof 302 and the tree 312 and the image segment 348 includes the roof 308 and the tree 310.

The segmentation module 222 may be further configured to segment the image by grouping together pixels of the image that are similar. Note that in images, when pixels within the image belong to the same object within the image, the pixels tend to have similar features, such as similar color values in a corresponding color space (e.g., the RGB color space and/or LAB color space), and to be located close together. Similar pixels located close together may be grouped together by the segmentation module 222 to form super pixels of similar adjacent pixels. The segmentation module 222 may use an algorithm, such as super linear iterative clustering (SLIC), to group the pixels of the image into super pixels and thus segment the image. SLIC may use a modified k-means clustering approach to form super pixels. SLIC takes K, the number of super pixels to be formed, and m, the compactness factor, as input. For an image with N pixels, the approximate size of each super pixel is about N/K pixels.

Therefore, there will be a super pixel center at every interval S, where $S=(N/K)^{1/2}$. A modified distance measure D is given by $(d_{lab}+d_{xy}(m/S))$, where $d_{lab}$ is the Euclidean distance in the LAB color space and $d_{xy}$ is the Euclidean distance in a location space, such as an x, y coordinate location of a pixel within the image.

To perform SLIC, K random super pixel centers may be selected that are at a distance S apart. For each pixel in the image, the closest super pixel is then identified using the above mentioned distance measure D. All pixels are then assigned to the closest super pixel. The location of the super pixel center for each super pixel is updated by calculating a new center of each super pixel using the newly assigned pixels to each super pixel. After the assignment of the new super pixel centers, the process of assigning pixels to super pixels is repeated. Multiple iterations of assigning pixels to super pixels and calculating the center of the super pixels may be performed until a convergence occurs to a stable solution. Alternately or additionally, other algorithms may be used by the segmentation module 222 to segment the image.

Segmentation of an image into super pixels is illustrated in FIG. 3C. In particular, FIG. 3C illustrates the segmentation of roofs 302 and 308 into super pixels, such as super pixels 318 and 316. FIG. 3C illustrates segmentation of just the roofs 302 and 308 and no other portions of the images segments 342 and 348 for clarity. During operation, the segmentation module 222 segments the entire image segments 342 and 348 similar to how the roofs 302 and 308 are segmented in FIG. 3C. In some embodiments, various super pixels may include pixels that are not part of an object. For example, the super pixel 318 includes some pixels that may not be part of the roof 302.

The classification module 224 may be configured to classify the super pixels generated by the segmentation module 222. The classification module 224 may classify the super pixels into various classes. For example, the classification module 224 may classify the super pixels as being part of a roof or not part of a roof. Alternately or additionally, the classification module 224 may classify the super pixels using additional categories, such as, roof, tree, road, cement, grass, and others categories.

The classification module 224 may classify the super pixels into classes based on the features of the super pixels. Super pixels may have various features that may include a color of the super pixels and a texture of the super pixels, among others. The color of a super pixel may be determined based on the RGB and/or the LAB color spaces of the pixels within the super pixel. In some embodiments, the color in the RGB and/or the LAB color spaces determined for a super pixel may be a mean, medium, probability distribution, or some combination or selection of the RGB and/or the LAB color spaces of the pixels within the super pixel. Using a combination of the RGB and the LAB color spaces provides the classification module 224 six features to use to classify the super pixels within an image.

The texture of a super pixel may be extracted by convoluting the super pixel with Gabor filters. Texture features for a super pixel are extracted at different angles and frequencies using a Gabor filter to obtain responses over a varied range. The responses may be concatenated to form a feature vector of the textural features. Note that each pixel within a super pixel may be associated with several values for each textural feature extracted from the super pixel depending on the number of angles and frequencies chosen for the super pixel. The textural features for a super pixel may be obtained taking a mean, medium, probability distribution, or some other combination or selection of the texture features of the pixels within the super pixel.

After determining the features of the super pixels, the classification module 224 may classify the super pixels into classes. In some embodiments, the classification module 224 may classify the super pixels using machine learning by way of a support vector machine (SVM) or a Bayesian model. In these and other embodiments, the classification module 224 may be taught to distinguish between classes of super pixels based on known features of super pixels.

The 2D identification module 226 may be configured to group adjacent super pixels with similar classifications as determined by the classification module 224. The 2D identification module 226 may group adjacent super pixels with similar classifications into polygons. The grouping of the adjacent super pixels with similar classifications may be performed using standard two pass connected component labeling. After grouping adjacent super pixels into polygons, corners and edges of the polygons may be detected and the edges may be smoothed to form straight edges. In some embodiments, the 2D identification module 226 may be configured to analyze polygons formed from the super pixels classified as roof super pixels to catch errors in the classification of the super pixels. For example, if a polygon formed from roof super pixels has a size beyond predetermined parameters, the 2D identification module 226 may determine that the polygon is not a roof, but may be a road or some other object with similar colors and/or texture like a roof.

The 2D identification module 226 may also be configured to determine a footprint of a roof by determining an area of a roof polygon formed by super pixels classified as a roof and grouped together. The 2D identification module 226 may determine a footprint of a roof polygon by counting a number of pixels within the super pixels that are grouped in the roof polygon and determining the pixel to a standard unit of measurement ratio, such as a pixel to meter ratio, based on a scale indicated on an image that is segmented into the super pixels.

The 2D identification module 226 may also be configured to determine a longitude and a latitude of a roof polygon within an image and an orientation of the roof polygon using information within an image that is used to form the roof polygon.

The 3D identification module 228 may be configured to obtain additional properties of a roof, such as a height of the roof and a slope angle of the roof. In particular, the 3D identification module 228 may be configured to obtain additional properties for each face of the roof. To obtain the additional properties of the roof, the 3D identification module 228 may obtain an image with a front view of a structure that includes the roof. The image may be obtained from one or more of the databases 150 through the network 140. In some embodiments, the image may be a publically provided street level view of the structure available from Google, Microsoft, or some other provider. The image may be a still image or part of a video.

The 3D identification module 228 may obtain roof properties of a structure within an image containing a front view of a structure by removing other objects from the image besides the structure. For example, the image may be segmented into regions. A region including the structure may be determined based on a position of the structure within the image, a shape of the structure, and/or a color of the structure. Regions not including the structure may be removed.

With objects besides the structure removed from the image, walls of the structure may be identified using an edge detection algorithm, such as a canny edge detection algorithm or a Gabor filter. A highest point of the structure may also be identified. An angle formed between a horizontal line and a line that runs between the highest point of the structure and a highest point of the walls of the structure may be a slope angle of a roof of the structure. A height of a roof may also be identified given a height off the ground of a camera or recorder that captured an image/video of a front view of a structure.

Alternately or additionally, the 3D identification module 228 may obtain various aerial images of a structure at different angles and/or orientations. The images may be obtained from one or more of the databases 150 through the network 140. In some embodiments, the images may be a publically provided satellite images of the structure available from Google, Microsoft, or some other provider. The image may be a still image or part of a video.

When the images are aerial images taken at an angle to a direct overhead view of the structure, the height of the structure may be determined by identifying the distance between a highest point of the structure and a base of the structure using a standard measurement ratio.

Aerial images at different orientations, such as from North, South, East or West, may be used in conjunction with the image taken at an angle to a direct overhead view of the structure to identify a height of the structure at boundaries of the structure. Using a previous determined height of the structure and the height of the structure at the various boundaries of the structure, a slope angle of a roof of the structure may be estimated.

Modifications, additions, or omissions may be made to the roof property module 220 without departing from the scope of the present disclosure. For example, the segmentation module 222 within the roof property module 220 may not be configured to receive a map indicating lots. In these and other embodiments, the segmentation module 222 may not segment an image based on lots indicated on a map, but may segment the image by grouping pixels together. As another example, the segmentation module 222 may not be configured to segment an image by grouping pixels into super pixels. In these and other embodiments, the classification module 224 may classify individual pixels within the image.

Figure 4:
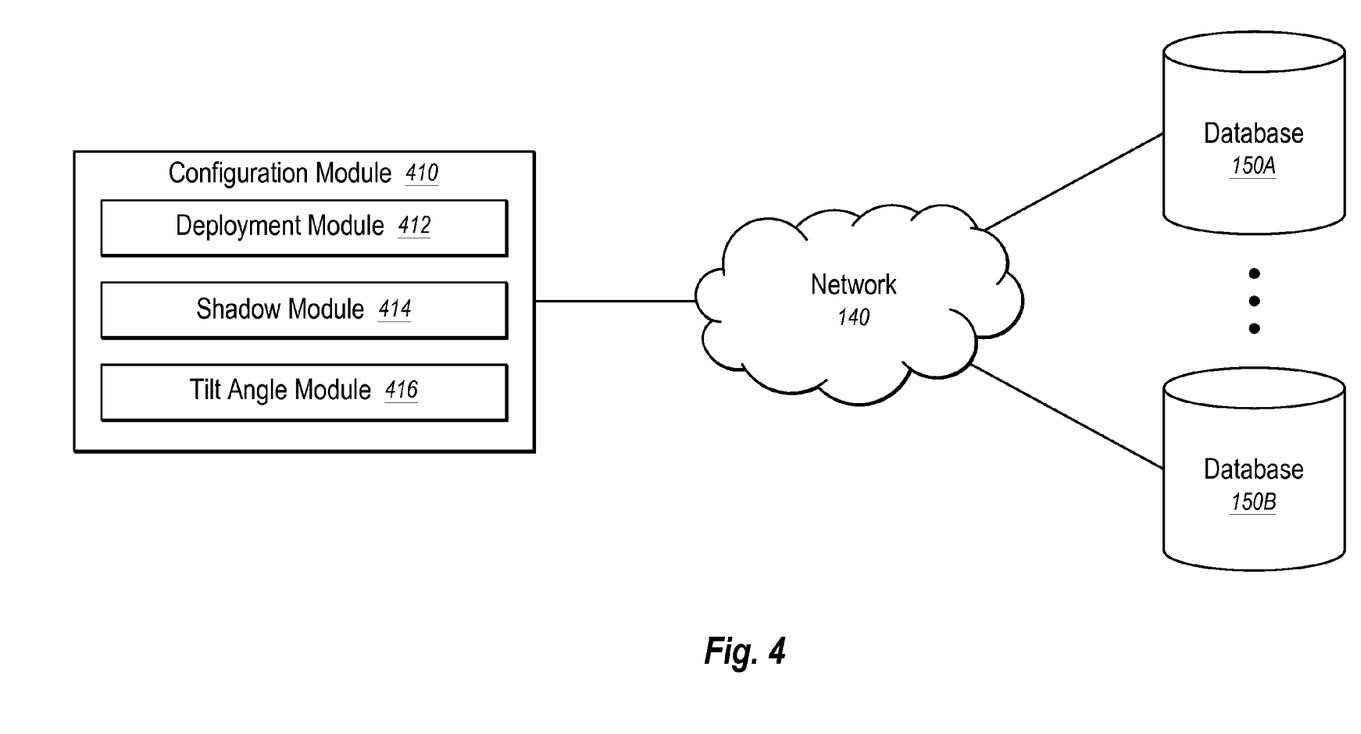
FIG. 4 illustrates an example configuration module.

FIG. 4 illustrates an example configuration module 410, arranged in accordance with at least some embodiments described herein. The configuration module 410 may be configured to determine configurations of solar panels on roofs. In particular, the configuration module 410 may be configured to determine configurations of solar panels on roofs based on properties of the roofs and a desired outcome. In some embodiments, the configuration module 410 may be part of a solar panel deployment configuration and management system, such as the system 110 of FIG. 1. In particular, the configuration module 410 may be part of or used in place of the configuration module 122 of the system 110 of FIG. 1.

The configuration module 410 may be coupled to the network 140 and databases 150. The network 140 and the databases 150 have been described above with respect to FIG. 1, as such no further explanation is provided here. The configuration module 410 may include a deployment module 412, a shadow module 414, and a tilt angle module 416.

The deployment module 412 may be configured to determine, for one or more faces of a roof, possible deployments of solar panels on the roof based on properties of the roof and specifications of the solar panels, such as a length and a width of an individual solar panel. In some embodiments, the possible deployments of solar panels on a roof may have two variable factors, including a number of solar panels deployed on the roof and the orientation of the solar panels (i.e. landscape orientation versus portrait orientation). For given properties of a roof, the deployment module 412 may determine the possible combinations of solar panel deployments using the two variable factors of the number of solar panels and the orientation of the solar panels. The deployment module 412 may further determine the possible combinations of solar panel deployments based on a desired outcome of an amount of electricity to be generated by the solar panels.

The shadow module 414 may be configured to determine for how long and/or when a portion of a roof may be shaded by an adjacent object. To determine shading of a portion of a roof, the position of the sun relative to the roof may first be determined. The position of the sun (i.e. a solar elevation angle $\alpha_s$ and a solar Azimuth angle $\gamma_s$) at any given time may be determined based on the sun declination angle, the latitude at which the roof is found, and a sun hour angle.

The shadow module 414 may determine that a portion of the roof may be shaded by an object when the object is higher than the portion of the roof, along the direction of the solar Azimuth angle between the portion of the roof and the sun, and adjacent to the roof. In particular, a portion of the roof may be determined to be shaded when $h_o >= h_s + (d * \sin \alpha_s)$ at the direction of the solar Azimuth angle, where d is the distance between the portion of the roof and the object, $h_o$ is the height of the object and $h_s$ is the height of the portion of the roof. The height of the portion of the roof, the height of the object, and the distance between the roof and the object may be determined by the shadow module 414 or some other module, such as the roof property module 220 of FIG. 2, or received as input data from one or more of the databases 150. Using the formula to determine shading, an amount of area of a roof and the amount of time for a given area of the roof that is shaded may be determined.

The tilt angle module 416 may be configured to determine a tilt angle for solar panels deployed on a roof of a structure. The tilt angle module 416 may take into account a slope of a roof as well as other properties of the roof. The tilt angle of solar panels deployed on a roof may be determined based on a desired amount of electricity to be generated by the solar panels. As an example, when the desired outcome is to maximize electricity generated by solar panels, a tilt angle that minimizes the angle between direct sunlight and the normal vector of the solar panels may be determined. The tilt angle of solar panels may be determined based on the following:

$$\mathrm{argmax}_{\{\beta\}} \Delta A \times \eta$$

$$\sum_{d=1}^{365} \sum_{t=1}^{24} \sum_{\Delta A} \left\{ \frac{G_h - D_h}{\sin \alpha_S} \cdot (-\sin\beta\sin\gamma\cos\delta\sin\omega + \sin\beta\cos\gamma\sin\delta\cos\varphi - \right.$$

$$\sin\beta\sin\gamma\cos\varphi\sin\omega + \cos\beta\cos\delta\cos\varphi\cos\omega +$$

$$\left. \cos\beta\sin\delta\sin\varphi) + D_h \cdot \frac{180 - \beta}{180} \right\}$$

where $\beta$ is the tilt angle, $\Delta A$ is an area of the solar panels, $\delta$ is the sun declination angle, $\gamma$ is the module azimuth angle that may be determined based on the orientation of the roof and the configuration of the solar panels, $\eta$ is the conversion efficiency of the solar panels, $\omega$ is the sun hour angle, $\alpha_s$ is the solar elevation angle, $\phi$ is the latitude of the structure, $G_h$ is the global solar horizontal irradiances, and $D_h$ is the solar diffusion. In some embodiments, the shading of the solar panels may be considered when determining the tilt angle. In some embodiments, weather information may also be used in determining the tilt angle. For example, the temperature may affect the conversion efficiency $\eta$ of the solar panels. As another example, cloud cover may affect the amount of global solar horizontal irradiances and solar diffusion. In these and other embodiments, a learning machine prediction model may be used to determine the effect of the cloud cover on the global solar horizontal irradiances and solar diffusion. In some embodiments, the tilt angle module 416 may consider an interconnectivity of the solar panels and mechanisms for interconnecting the solar panels. For example, the solar panels may be connected in series to a single DC/AC converter. In these and other embodiments, shading of one of the solar panels or other defects or problems of one of the solar panels may raise an impedance of the one of the solar panels. The raised impedance of the one of the solar panels may raise an impedance of the serially connected solar panels resulting in a reduction of electricity generated by the serially connected solar panels. In some embodiments, the serially connected solar panels may be interconnected with a mechanism to disconnect shaded or otherwise defective solar panels with increased impedances from the remaining serially connected solar panels so that electricity generation of the remaining serially connected solar panels is not affected.

The tilt angle of solar panels deployed on a roof may also be determined based on a desired amount of revenue to be generated by the solar panels or on other considerations. As an example, a tilt angle may be determined when the desired outcome is to maximize annual revenue generated by solar panels. To determine how to maximize annual revenue generated by solar panels, information concerning rates at which a structure purchases electricity and/or rates at which a structure may sell excess electricity may be needed. In some embodiments, information concerning the electricity usage of the structure may also be used. For example, assume that electricity usage during the afternoon is higher than electricity usage during the morning. In these and other embodiments, the tilt angle of solar panels on the structure may be configured to maximize production during the afternoon to reduce or eliminate the electricity needed by the structure from a power grid.

As another example, assume that electricity rates during the afternoon for both purchasing and selling are higher than electricity rates during the morning. In these and other embodiments, the tilt angle of the solar panels on the structure may be configured to maximize production during the afternoon to reduce or eliminate the electricity needed by the structure from a power grid when the electricity is most costly and achieve higher returns for selling excess electricity. In these and other examples, the tilt angle of solar panels may be determined based on the following:

$$\max_{\{\gamma,\beta\}} \Sigma_{d=1}^{365} \Sigma_{t=1}^{24} \Sigma_{\Delta A} \{r_s(t) \cdot H(E[P_{PV}(\gamma,\beta,d,t)] - D(t)) - r_p(t) \cdot H(D(t) - E[P_{PV}(\gamma,\beta,d,t)])\}$$

where H(x) is a unit step function:

$$H(x) = \begin{cases} 1, & \text{if } x \geq 0 \\ 0, & \text{if } x < 0 \end{cases},$$

D(t) is a time dependent electricity demand of the structure, $r_s(t)$ is a time dependent rate for selling electricity generated at the structure, $r_p(t)$ is a time dependent rate for purchasing electricity for the structure, and $E[P_{PV}(\gamma,\beta,d,t)] = \text{Avg}_{y=1-n}\{E_{\Delta A} \Delta A \times S_{module}(d,t,\Delta A) \times \eta(n,d,t)\}$ which estimate an average electricity generation of solar panels under historic weather conditions for n years.

Modifications, additions, or omissions may be made to the configuration module 410 without departing from the scope of the present disclosure. For example, the configuration module 410 may not include the shadow module 414. In these and other embodiments, the configuration module 410 may determine a configuration of solar panels assuming no shading of the solar panels occurs.

Figure 5:
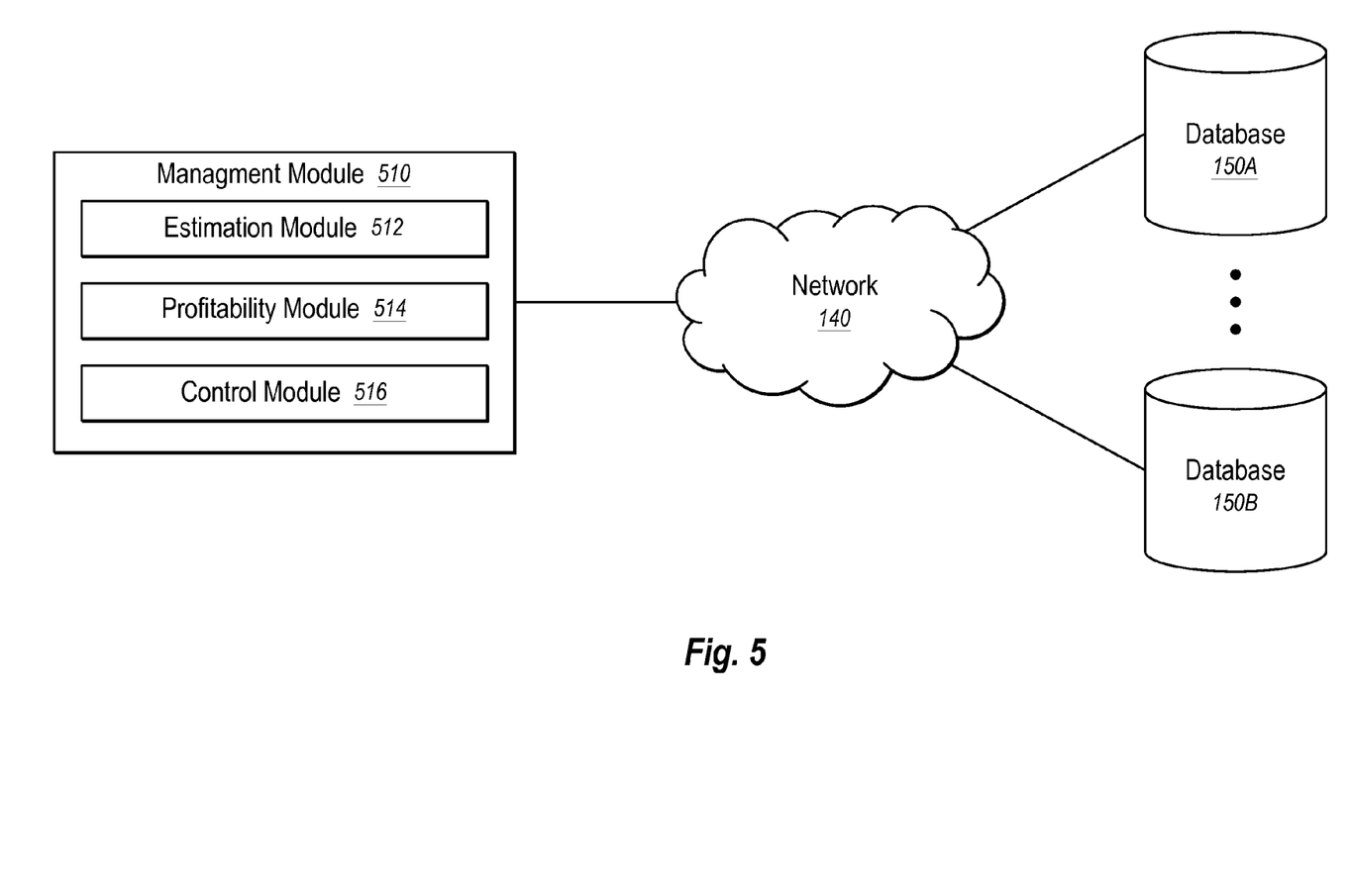
FIG. 5 illustrates an example management module.

FIG. 5 illustrates an example management module 510, arranged in accordance with at least some embodiments described herein. The management module 510 may be configured to predict a profitability of deploying solar panels and provide information for managing deployed solar panels. In some embodiments, the management module 510 may be part of a solar panel deployment configuration and management system, such as the system 110 of FIG. 1. In particular, the management module 510 may be part of or used in place of the management module 124 of the system 110 of FIG. 1.

The management module 510 may be coupled to the network 140 and databases 150. The network 140 and the databases 150 have been described above with respect to FIG. 1, as such no further explanation is provided here. The management module 510 may include an estimation module 512, a profitability module 514, and a control module 516.

The estimation module 512 may be configured to estimate an expected amount of electricity to be generated by solar panels on a roof based on a given configuration of the solar panels on the roof. In some embodiments, the estimation module 512 may estimate an expected amount of electricity to be generated by the solar panels, assuming clear constant skies, using the following equation:

$$\Sigma_{\Delta A} \Delta A \times S_{module}(d,t,\Delta A) \times \eta,$$

where $S_{module}$ is the total amount of radiation received by the solar panels during a day of a year d, and at a time t of the day as determined by the tilt angle, one or more roof properties, and the given configuration of the solar panels on the roof and η is the conversion efficiency of the solar panels.

In some embodiments, the estimation module 512 may estimate an expected amount of electricity to be generated by the solar panels based on historical weather patterns over a period, such as 1 month, 1 year, or 3 years.

The profitability module 514 may be configured to determine the profitability of deploying solar panels on a roof based on estimates of expected amounts of electricity to be generated by the solar panels as determined by the estimation module 512. The profitability module 514 may determine a profitability of deploying solar panels based on one or more the following factors: a cost of purchasing the solar panels, a cost of installing the solar panels, a cost of maintaining the solar panels, financial programs that may provide money for deploying the solar panels, solar electricity buyback programs, government subsidies, interest rates, among others. Information about the factors considered by the profitability module 514 may be received from one or more of the databases 150. The profitability module 514 may provide profitability results regarding deployment of solar panels that relate to a net present value, a profitability index, a payback time, and a rate of return.

When considering the profitability of deploying solar panels on more than one structure, the profitability module 514 may determine the profitability of all or some of the structures together or individually. Alternately or additionally, the profitability module 514 may determine the profitability of all of or some of the structures together after determining the profitability of each structure and eliminating lower profitability structures from the determination.

The control module 516 may be configured to estimate an expected amount of electricity to be generated by solar panels deployed on one or more structures based on a known configuration of the solar panels. For example, the control module 516 may determine an expected impact of electricity generation based on real time weather reports. In some embodiments, the control module 516 may determine the expected impact using information gathered about how weather affects electricity generation of the solar panels after the solar panels are deployed. By determining the impact of weather conditions or other factors on electricity generation of the solar panels, the control module 516 may assist in managing the solar panels and the power grid to which the solar panels are connected by providing information regarding the stability of the electricity generation of the solar panels and other information about the electricity generation of the solar panels.

In some embodiments, the control module 516 may determine additional actions that may be performed to assist in managing a power grid besides just providing information about the electricity generation of the solar panels within the power grid. For example, in some embodiments, the control module 516 may determine to increase electricity generation of electric generators coupled to the power grid in order to compensate for a loss of electricity generation from solar panels caused by weather effects or other factors that may affect electricity generation from the solar panels. As another example, the control module 516 may determine to initiate a demand response event to reduce a load of some users in a power grid in order to compensate for a loss of electricity generation from solar panels caused by weather effects or other factors that may affect electricity generation from the solar panels. Modifications, additions, or omissions may be made to the management module 510 without departing from the scope of the present disclosure.

Figure 6:
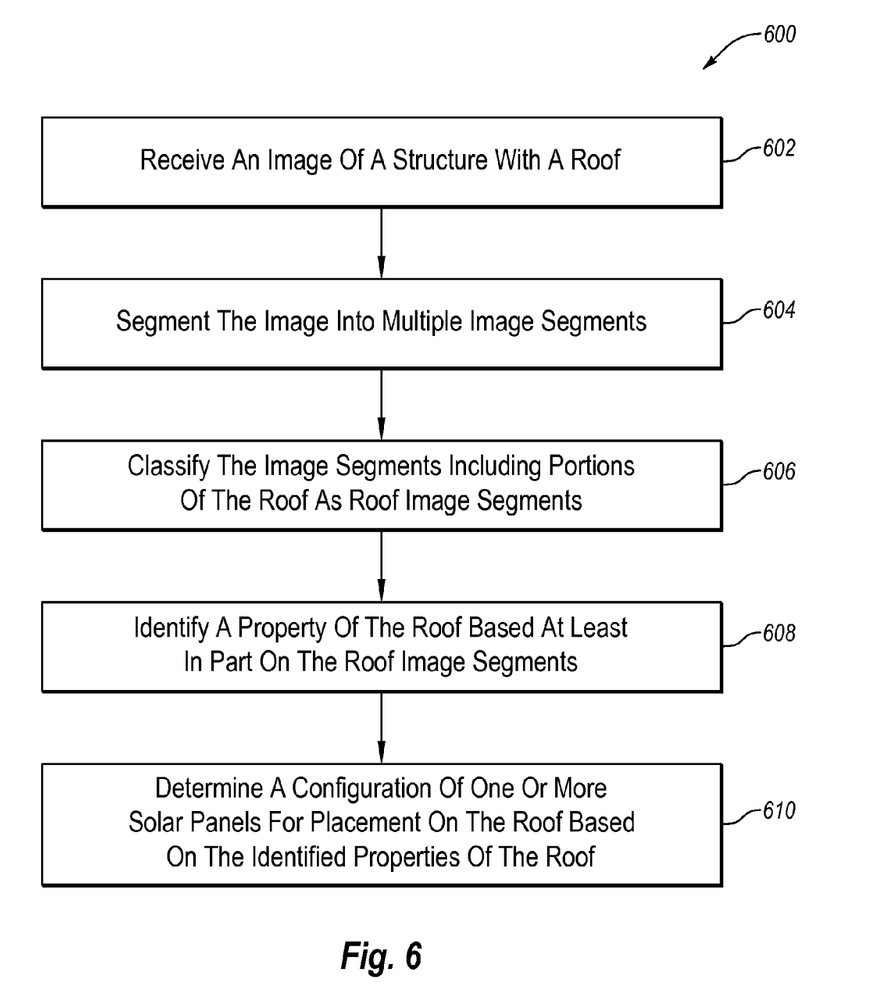
FIG. 6 is a flow chart of an example method of determining solar panel deployment configurations.

FIG. 6 is a flow chart of an example method 600 of determining solar panel deployment configurations, arranged in accordance with at least some embodiments described herein. The method 600 may be implemented, in some embodiments, by a solar panel deployment and management system, such as the system 110 of FIG. 1. For instance, the system 110 of FIG. 1 may be configured to execute computer instructions to perform operations for determining solar panel deployment configurations and management as represented by one or more of blocks 602, 604, 606, 608, and/or 610 of the method 600. Although illustrated as discrete blocks, various blocks may be divided into additional blocks, combined into fewer blocks, or eliminated, depending on the desired implementation.

The method 600 may begin at block 602, in which an image of a structure with a roof may be received. The image may be an aerial image of the structure, such as a satellite image. The image may be a still image or a video image and may be obtained through a network from a public or private database or from some other source.

In block 604, the image may be segmented into multiple image segments. The image may be segmented into the multiple image segments using a variety of algorithms.

In block 606, the image segments that include portions of the roof may be classified as roof image segments. In some embodiments, the image segments may be classified as the roof image segments based on a color of the image segments and/or a texture of the image segments.

In block 608, a property of the roof may be identified based at least in part on the roof image segments. The property of the roof that may be identified may include a footprint of the roof, a slope angle of the roof, an orientation of the roof, or a height of the roof, among others. In some embodiments, multiple properties of the roof may be identified based at least in part on the roof image segments.

In block 610, a configuration of one or more solar panels for placement on the roof may be determined based on the identified properties of the roof. Determining the configuration of the one or more solar panels may also be based on one or more of: an orientation of the one or more solar panels, a number of the one or more solar panels, shading of the roof, weather factors, electricity usage of the structure, and a tilt angle of the one or more solar panels.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, identifying the property of the roof in the method 600 when the property of the roof is a footprint of the roof may include grouping the roof image segments into a polygon and smoothing detected edges of the polygon to form the footprint of the roof. As another example, identifying the property of the roof in the method 600 when the property is the slope angle of the roof may include receiving a street view image of the structure, isolating the structure within the street view image, and identifying an angle between a horizontal and a line between a high point of the structure and a wall high point of a wall of the structure.

The method 600 may further include estimating expected power generation of the one or more solar panels based on the configuration of the one or more solar panels. The method 600 may further include managing power generation of the one or more solar panels based on the expected power generation. The method 600 may also include estimating a profitability of the placement of the one or more solar panels on the roof based on the expected power generation of the one or more solar panels.

Figure 7:
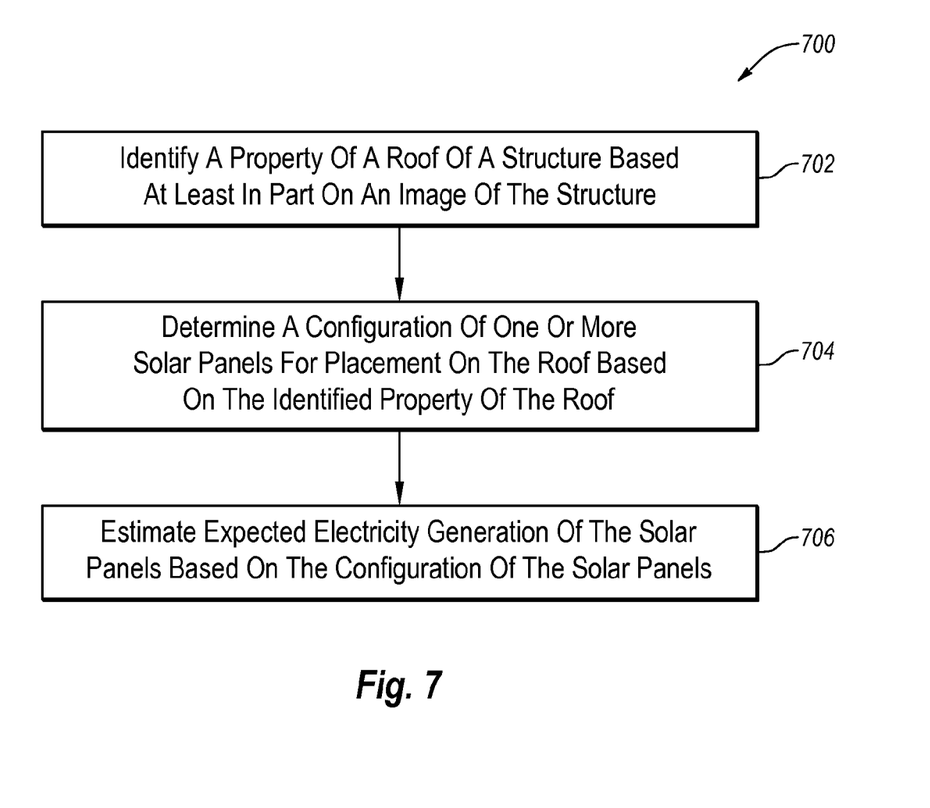
FIG. 7 is a flow chart of another example method of determining solar panel deployment configurations.

FIG. 7 is a flow chart of another example method 700 of determining solar panel deployment configurations, arranged in accordance with at least some embodiments described herein. The method 700 may be implemented, in some embodiments, by a solar panel deployment and management system, such as the system 110 of FIG. 1. For instance, the system 110 of FIG. 1 may be configured to execute computer instructions to perform operations for determining solar panel deployment configurations and management as represented by one or more of blocks 702, 704, and/or 706 of the method 700. Although illustrated as discrete blocks, various blocks may be divided into additional blocks, combined into fewer blocks, or eliminated, depending on the desired implementation.

The method 700 may begin at block 702, where a property of a roof of a structure may be identified based at least in part on an image of the structure. The identified property of the roof may be a footprint of the roof, a slope angle of the roof, an orientation of the roof, or a height of the roof, among others. In some embodiments, multiple properties of the roof may be identified.

In block 704, a configuration of one or more solar panels for placement on the roof may be determined based on the identified property of the roof. In some embodiments, determining the configuration of the solar panels may be further based on one or more of: an orientation of the solar panels, a number of the solar panels, shading of the roof, weather factors, electricity usage of the structure, and a tilt angle of the solar panels, among others.

In block 706, an expected electricity generation of the solar panels may be estimated based on the configuration of the solar panels.

The outlined steps and operations of the method 700 are only provided as examples, and some of the steps and operations may be optional, combined into fewer steps and operations, or expanded into additional steps and operations without detracting from the essence of the disclosed embodiments.

For instance, the method 700 may further include managing electricity generation of the solar panels based on the expect electricity generation under one or more conditions. The method 700 may further include estimating a profitability of the placement of the solar panels on the roof based on the expected electricity generation of the solar panels.

As another example, when identifying the property of the roof, the method 700 may further include receiving the image of the structure with the roof and segmenting the image into a plurality of image segments. Alternately or additionally, when identifying the property of the roof, the method 700 may further include classifying the plurality of image segments including portions of the roof as roof image segments and identifying the property of the roof based at least in part on the roof image segments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of determining solar panel deployment configurations, the method comprising:
   receiving an image with a plurality of structures with roofs;
   receiving a map corresponding to the image, the map including indications of parcels of land;
   segmenting the image into a plurality of land segments that correspond with the parcels of land in the map;
   estimating expected power generation for each of the plurality of land segments of a region, wherein estimating the expected power generation for a first of the plurality of land segments includes:
      segmenting the first of the plurality of the land segments into a plurality of image segments;
      classifying the plurality of image segments that include portions of a roof as roof image segments;
      identifying a property of the roof based at least in part on the roof image segments;
      determining a configuration of one or more solar panels for placement on the roof based on the identified property of the roof; and
      estimating the expected power generation of the first of the plurality of land segments based on the configuration of the one or more solar panels; and
   estimating a profitability of the placement of the solar panels in the region based on the expected power generation for each of the plurality of land segments.

2. The method of claim 1, wherein the classifying the image segments as the roof image segments is performed based on a color of the image segments or a texture of the image segments.

3. The method of claim 1, wherein the determining the configuration of the one or more solar panels is further based on one or more of: an orientation of the one or more solar panels, a number of the one or more solar panels, shading of the roof, weather factors, electricity usage of the structure, time dependent electricity rates, and a tilt angle of the one or more solar panels.

4. The method of claim 1, wherein the property of the roof comprises a footprint of the roof, a slope angle of the roof, an orientation of the roof, or a height of the roof.

5. The method of claim 4, wherein the property of the roof comprises the footprint of the roof, the method further comprises:
   grouping the roof image segments into a polygon; and
   smoothing detected edges of the polygon to form the footprint of the roof.

6. The method of claim 4, wherein the property of the roof comprises the slope angle of the roof, the method further comprises:
   receiving a street view image of at least one of the plurality of structures;
   isolating the structure within the street view image;
   automatically identifying walls of the structure;
   automatically identifying a high point of the structure;
   automatically identifying a wall high point of at least one of the walls; and
   automatically identifying an angle between a horizontal and a line between the high point of the structure and the wall high point of the wall.

7. The method of claim 1, further comprising managing power generation of the one or more solar panels based on the expected power generation.

8. A processor configured to execute computer instructions to cause a system to perform operations for solar panel deployment, the operations comprising:
- automatically identifying properties of roofs of a plurality of structures of a region based at least in part on an image of the plurality of structures without input from a user;
- determining a configuration of one or more solar panels for placement on the roofs of the plurality of structures based on the identified properties of the roofs;
- estimating expected electricity generation of the one or more solar panels based on the configuration of the one or more solar panels;
- estimating a first profitability of deploying the one or more solar panels on the roofs of the plurality of structures within the region; and
- estimating a second profitability of deploying solar panels for a plurality of regions including the region.

9. The processor of claim 8, wherein the operations further comprise managing electricity generation of the one or more solar panels based on the expected electricity generation under one or more conditions.

10. The processor of claim 8, wherein the operations further comprise
- ranking each of the plurality of regions based on the estimated second profitability of each region.

11. The processor of claim 8, wherein automatically identifying the properties of the roofs comprises the operations of:
- receiving the image of the plurality of structures with the roofs;
- segmenting the image into a plurality of image segments;
- classifying the plurality of image segments including portions of the roofs as roof image segments; and
- automatically identifying the properties of the roofs based at least in part on the roof image segments without input from the user.

12. The processor of claim 8, wherein the determining the configuration of the one or more solar panels is further based on one or more of: an orientation of the one or more solar panels, a number of the one or more solar panels, shading of the roof, weather factors, electricity usage of the structure, time dependent electricity rates, and a tilt angle of the one or more solar panels.

13. The processor of claim 8, wherein the property of the roof comprises a slope angle of the roof and automatically identifying the slope angle of the roof is based on a determined slope angle of a second roof of a second structure.

14. A non-transitory computer readable storage medium configured to cause a system to perform operations to deploy solar panels, the operations comprising:
- receiving an image with a plurality of structures with roofs;
- receiving a map corresponding to the image, the map including indications of parcels of land;
- segmenting the image into a plurality of land segments that correspond with the parcels of land in the map;
- for one or more of the land segments:
  - classifying portions of the one or more land segments of the image that include portions of a roof as roof image segments;
  - identifying a slope angle of the roof based at least in part on the roof image segments, identifying the slope angle of the roof including:
    - receiving a street view image of at least one of the plurality of structures with the roof;
    - automatically identifying walls of the structure;
    - automatically identifying a high point of the structure;
    - automatically identifying a wall high point of at least one of the walls; and
    - automatically identifying an angle between a horizontal and a line between the high point of the structure and the wall high point of the wall; and
  - determining a configuration of one or more solar panels for placement on
- the roof based on the identified slope angle of the roof.

15. The non-transitory computer readable storage medium of claim 14, wherein the operations further comprise estimating expected electricity generation based on the configuration of the one or more solar panels.

16. The non-transitory computer readable storage medium of claim 14, wherein the configuration of the one or more solar panels is determined based on one or more of: an orientation of the one or more solar panels, a number of the one or more solar panels, shading of the roof, weather factors, electricity usage of the structure, time dependent electricity rates, and a tilt angle of the one or more solar panels.

17. The non-transitory computer readable storage medium of claim 14, wherein the portions of the image are classified as the roof image segments based on a color of the portions of the image or a texture of the portions of the image.

* * * * *